(12) United States Patent
Wagner

(10) Patent No.: US 12,523,460 B2
(45) Date of Patent: Jan. 13, 2026

(54) SYSTEM AND METHOD FOR CHARACTERIZING A CONVEYOR BELT

(71) Applicant: Habasit Italiana S.p.A, Cesano Boscone, R&D Plastics, Zweigniederlassung Reinach/BL (Schweiz), Reinach (CH)

(72) Inventor: Klaus Wagner, Reinach (CH)

(*) Notice: Subject to any disclaimer, the term of this patent is extended or adjusted under 35 U.S.C. 154(b) by 0 days.

(21) Appl. No.: 18/069,221

(22) Filed: Dec. 20, 2022

(65) Prior Publication Data
US 2024/0200925 A1  Jun. 20, 2024

(51) Int. Cl.
*G01B 7/04* (2006.01)
*B65G 43/02* (2006.01)
*G01P 3/66* (2006.01)

(52) U.S. Cl.
CPC ............ *G01B 7/046* (2013.01); *B65G 43/02* (2013.01); *G01P 3/66* (2013.01); *B65G 2203/042* (2013.01)

(58) Field of Classification Search
CPC ......... G01D 5/145; G01D 21/00; G01D 5/142
See application file for complete search history.

(56) References Cited

U.S. PATENT DOCUMENTS

| | | | |
|---|---|---|---|
| 4,409,852 A | 10/1983 | Suzuki et al. | |
| 4,677,578 A * | 6/1987 | Wright | B21B 38/02 |
| | | | 702/158 |
| 5,291,131 A | 3/1994 | Suzuki et al. | |
| 5,845,187 A * | 12/1998 | Eggerstorfer | B65H 23/32 |
| | | | 399/384 |
| 6,047,814 A | 4/2000 | Alles et al. | |
| 6,876,896 B1 * | 4/2005 | Ortiz | B29C 65/7867 |
| | | | 318/135 |
| 7,347,317 B2 | 3/2008 | Aizawa | |
| 8,330,452 B2 | 12/2012 | Furukawa | |
| 8,436,607 B2 | 5/2013 | Alport et al. | |
| 9,139,376 B2 | 9/2015 | Andreoli et al. | |
| 10,660,266 B2 | 5/2020 | Wallace et al. | |
| 2003/0199349 A1 * | 10/2003 | Sands | G03G 15/755 |
| | | | 198/806 |

(Continued)

FOREIGN PATENT DOCUMENTS

| | | |
|---|---|---|
| CN | 104692078 A | 6/2015 |
| GB | 2406843 A | 4/2005 |

OTHER PUBLICATIONS

Continental, Conti SpliceProtect, Dec. 31, 2021.

*Primary Examiner* — Huy Q Phan
*Assistant Examiner* — Temilade S Rhodes-Vivour
(74) *Attorney, Agent, or Firm* — Hodgson Russ LLP

(57) ABSTRACT

A system for measuring a conveyor belt includes a first detector fixed at a location along a path of a conveyor belt. A first signal generator is affixed at a first location of the conveyor belt such that the first signal generator is detectable by the first detector when the first signal generator is in range of the first detector. The first detector is configured to provide a first signal as the first signal generator approaches the first detector. The first detector is configured to provide a second signal as the first signal generator moves away from the first detector. A processor is in electronic communication with the first detector and configured to calculate a belt speed based on an elapsed time between the first signal and the second signal.

20 Claims, 4 Drawing Sheets

(56) References Cited

U.S. PATENT DOCUMENTS

| | | | |
|---|---|---|---|
| 2004/0164747 A1* | 8/2004 | McGaha | G01R 31/31937 |
| | | | 324/644 |
| 2008/0133051 A1* | 6/2008 | Wallace | G05B 23/0232 |
| | | | 198/810.01 |
| 2019/0193946 A1* | 6/2019 | DeVries | G01M 13/028 |
| 2020/0088551 A1* | 3/2020 | Wissel | G01D 5/2458 |
| 2022/0092376 A1* | 3/2022 | Volkerink | G06Q 10/0833 |

\* cited by examiner

SYSTEM AND METHOD FOR CHARACTERIZING A CONVEYOR BELT

FIELD OF THE DISCLOSURE

The present disclosure relates to conveyor belts, and more particularly to measuring one or more characteristics of a conveyor belt.

BACKGROUND OF THE DISCLOSURE

Conveyor belts of various configurations are used an immense number of facilities throughout the world. Many conveyor belts, for example, spiral conveyor belts, have long belt lengths which often exceed 100 meters or more. Furthermore, conveyors may run twenty-four hours a day, seven days a week. As such, conveyor belts are subject to stretching, high wear, and other conditions, which must be addressed to avoid unplanned downtime. There is a long-felt need for techniques to provide data to determine belt condition, such as, for example, elongation, wear, etc. In this way, preventive maintenance programs can be tailored so as to minimize planned downtime, while avoiding any unplanned downtime.

BRIEF SUMMARY OF THE DISCLOSURE

In a first aspect, the present disclosure may be embodied as system for measuring a conveyor belt. This system includes a first detector configured to be fixed at a location along a path of a conveyor belt. The first detector may be a magnetic sensor, such as, for example, a hall-effect sensor. A first signal generator is configured to be affixed to (at) a first location of the conveyor belt such that the first signal generator is detectable by the first detector when the first signal generator is in range of the first detector. The first signal generator may be, for example, a magnet. The first detector is configured to provide a first signal as the first signal generator approaches the first detector. The first detector is configured to provide a second signal as the first signal generator moves away from the first detector. A processor is in electronic communication with the first detector and configured to calculate a belt speed based on an elapsed time between the first signal and the second signal. The processor may be further configured to calculate a belt length based on the calculated belt speed and time elapsed between two or more first signals and/or two or more second signals. The processor may be further configured to calculate a belt elongation based on the calculated belt length and a stored belt length value.

In some embodiments, the system includes a second detector at a fixed location along a path of the conveyor belt and located downstream from a belt drive in the direction of belt travel. The second detector may be configured to provide a signal as a signal generator (e.g., the first signal generator, etc.) approaches the second detector. The second detector may be configured to provide another signal as a generator (e.g., the first signal generator, etc.) moves away from the second detector. The processor may be configured to differentiate between belt elongation resulting from wear and belt elongation resulting from load. Such determination may be based in part on one or more signals provided by the second detector.

In some embodiments, the system includes one or more additional downstream detectors at a corresponding one or more fixed locations along a path of the conveyor belt downstream from the belt drive in the direction of belt travel. The one or more additional downstream detectors may be configured to provide signal(s) as a signal generator (e.g., the first signal generator, etc.) approaches the one or more additional downstream detectors. The one or more additional downstream detectors may be configured to provide other signal(s) as a generator (e.g., the first signal generator, etc.) moves away from the one or more additional downstream detectors. The processor may be configured to differentiate between belt elongation resulting from material loading on the belt and belt elongation resulting from friction. Such determination may be based in part on one or more signals provided by the one or more additional downstream detectors.

In some embodiments, the system includes a pole piece adjacent to the first detector and configured to direct a magnetic field of the first signal generator towards the first detector. In some embodiments, the system includes a distance sensor proximal to the first detector and configured to detect a distance to the conveyor belt. The processor may be configured to utilize a distance to the conveyor belt in calculating the belt speed (e.g., in evaluating the time elapsed between the first signal and the second signal, etc.) In some embodiments, the distance sensor is an ultrasonic sensor. In some embodiments, the distance sensor includes a magnetic sensor and a magnet. For example, the magnet may be affixed to the conveyor belt at a location proximal to the first signal generator, and the magnetic sensor is configured to provide a distance signal as the magnet passes the magnetic sensor.

In some embodiments, the system includes a second signal generator. The first detector may be configured to provide a third signal as the second signal generator approaches the first detector. The first detector may be configured to provide a fourth signal as the second signal generator moves away from the first detector. The processor may be configured to calculate a belt speed based on an elapsed time between the third signal and the fourth signal. The processor may be configured to calculate a belt segment length between the first signal generator and the second signal generator (e.g., based on at least one of the first signal and the second signal, and at least one of the third signal and the fourth signal). The processor may be configured to calculate a belt elongation based on the calculated belt segment length and a stored belt segment length value.

In another aspect, the present disclosure may be embodied as a method for measuring a conveyor belt. The method includes receiving, at a processor, a first signal generated when a first signal generator affixed to the conveyor belt comes within range of a first detector at a fixed location along a path of the belt. The method includes receiving, at the processor, a second signal generated when the first signal generator moves out of range of the first detector. A belt speed is calculated, using the processor, based on an elapsed time between the first signal and the second signal. The method may include calculating a belt length based on the calculated belt speed and time elapsed between two or more first signals and/or two or more second signals. The method may include calculating a belt elongation based on the calculated belt length and a stored belt length value.

In some embodiments, the method includes differentiating between a belt elongation resulting from wear and belt elongation resulting from load based on belt elongation calculated at the first detector and belt elongation calculated at a second detector, wherein the second detector is located at a fixed position along the path of the belt and downstream from a belt drive in a direction of belt travel. In some embodiments, the method includes differentiating between a belt elongation resulting from material loading and belt elongation resulting from friction based on belt elongation calculated at the second detector and belt elongation calculated at one or more additional downstream detectors, wherein the one or more additional downstream detectors are located at a corresponding one or more fixed locations along the path of the belt and downstream of the belt drive.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
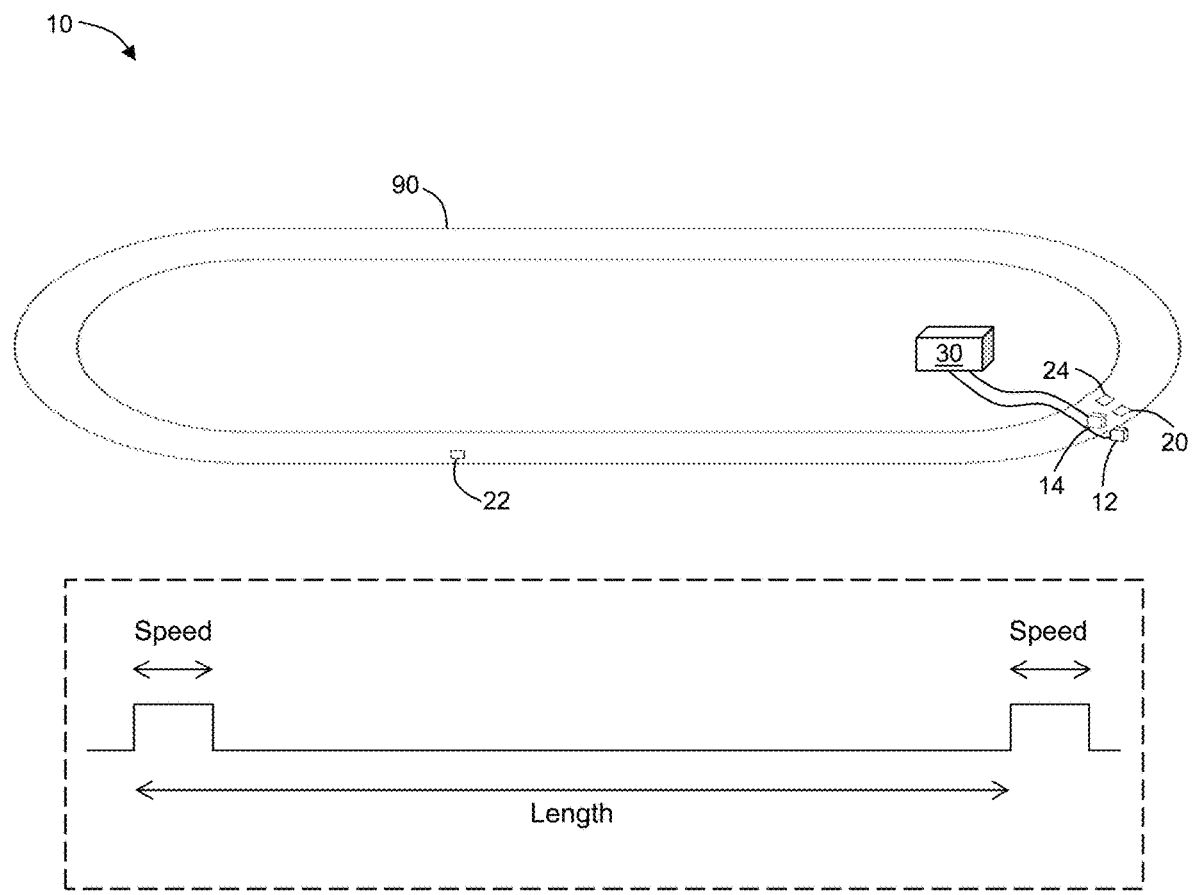
FIG. 1 is a diagram of a system according to an embodiment of the present disclosure.

With reference to FIG. 1, the present disclosure may be embodied as a system 10 for measuring a conveyor belt 90. The system may be used to measure various parameters of the belt such as, for example, a speed of the conveyor belt, a length of the conveyor belt (or a segment of the conveyor belt), and/or an elongation of the conveyor belt (or a segment of the conveyor belt). The system may be used with a modular belt, a flat belt, a hybrid belt, a chain, a spiral conveyor, or any other type of belt or conveyor system.

The system 10 includes a first detector 12 located at a fixed location along a path of the conveyor belt 90. A first signal generator 20 is configured to be affixed to a first location of the conveyor belt. In this way, the first signal generator 20 is detectable by the first detector 12 when the first signal generator is in range of the first detector. In an illustrative example, the first signal generator may be a magnet, such as, for example, a permanent magnet, and the first detector may be a magnetic sensor, such as, for example, a hall effect sensor. As the conveyor moves through its path, the first signal generator will approach the first detector, come within a detecting range of the first detector, and move away from the first detector. Other examples of systems of signal generators and corresponding detectors include optical systems, ultrasonic systems, and the like.

The first detector 12 is configured to provide a first signal as the first signal generator 20 approaches the first detector, and a second signal as the first signal generator 20 moves away from the first detector 12. For example, the first signal may be a rising edge of a digital signal (e.g., a logic '0' value moving to a logic '1' value), and the second signal may be a falling edge of the digital signal (e.g., a logic '1' changing to a logic '0').

The system 10 includes a processor 30 in electronic communication with the first detector 12. The processor 30 is configured to calculate a belt speed based on an elapsed time between the first signal and the second signal. For example, using a priori knowledge of the distance between a position of the first signal generator when a first signal is provided by the first detector and a positon of the first signal generator when a second signal is provided by the first detector, and the time elapsed for the first signal generator to travel this distance (i.e., the time elapsed between the first signal and the second signal received from the first detector), the processor is configured to determine the speed of the belt (in a simple example, $$\frac{distance}{time}).$$

In some embodiments, the processor may account for factors such as the radius of a curve in systems where the first detector is located on the curve, the radius of a spiral belt system, the transverse (with respect to a direction of belt travel) location of the first signal generator on the belt, etc.

Having determined the speed of the conveyor belt, in some embodiments, the processor 30 is further configured to calculate a length of the belt. For example, using the time elapsed between subsequent first signals received by the processor, and the calculated belt speed, a length of the belt may be calculated. In some embodiments, multiple passes of the conveyor may be used. For example, two passes of the belt may be used, and divided by two, so as to average the elapsed time per lap of the belt. For example:

$$\text{Belt Length} = \text{Belt Speed} \times \text{Average Elapsed Time} \qquad (1)$$

In some embodiments, the processor 30 is further configured to calculate a belt elongation. For example, using the calculated belt length and a stored previous value of the belt length, the elongation may be calculated. In some embodiments, the previous belt length may be subtracted from the calculated belt length to determine a belt elongation. In some embodiments, the belt length values may be divided to provide a ration (and/or percentage) elongation. The stored previous value of belt length may be an initial belt length (e.g., measured when the belt was new) or a subsequent belt length. For example, belt elongation may be tracked periodically (e.g., daily, weekly, monthly, etc.) so as to monitor elongation trends.

Figure 3:
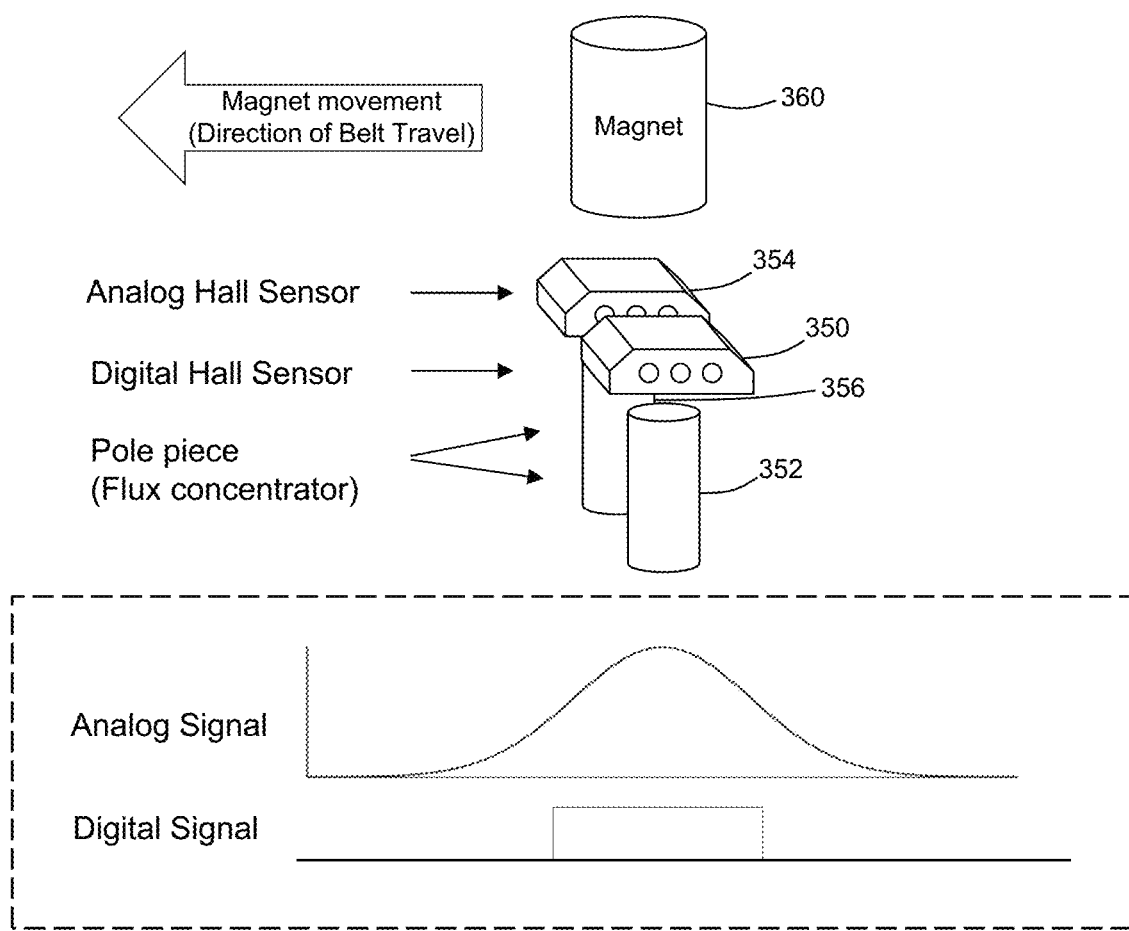
FIG. 3 is a diagram of a portion of a system according to another embodiment of the present disclosure.

The time elapsed between the first signal and the second signal and/or the distance traveled by the first signal generator during the elapsed time may vary depending on the distance between the first detector 12 and the first signal generator 20. In some embodiments, a distance sensor may be proximal to the first detector. The distance sensor may be, for example, a magnet 24 and magnetic sensor 14. The magnet 24 may be configured to be affixed to the conveyor belt 90 at a location proximal to the first signal generator 20. The magnetic sensor may be configured to provide a distance signal to the processor as the magnet passes the magnetic sensor (i.e., passes within a detecting range of the magnetic sensor). In another example, the distance sensor is an ultrasonic sensor. The distance sensor is configured to detect a distance to the conveyor belt. The processor may be further configured such that the calculation of belt speed takes into account a distance between the distance sensor (and thus, the first detector) and the conveyor belt. With reference to FIG. 3, in an example system, an analog hall sensor 354 is used to measure a magnetic field of a magnet 360 in order to measure a distance from the sensor to the magnet. For example, the distance may be represented by the maximum value measured by the hall sensor, the area under the curve of values measured, or other characteristics of the measured magnetic field. In some embodiments, the distance is a relative distance (e.g., relative to the distance(s) measured on previous cycle(s) of the conveyor). In this way, the belt speed calculation may compensate for the distance to the belt. FIG. 3 shows an embodiment where magnet 360 used for sensing distance is the same magnet as the first signal generator (i.e., detected by the first detector (digital hall sensor 350)). In some embodiments, the first signal generator may be used to detect the first signal generator and also to measure a distance to the belt.

In some embodiments, the system 10 includes a second signal generator 22. The second signal generator 22 may be configured to be affixed to a second location of the conveyor belt, which is longitudinally spaced apart from the first location (in the direction of belt travel). In this way, the second signal generator 22 is detectable by the first detector 12 when the second signal generator is in range of the first detector. In an illustrative example, the second signal generator may be a magnet. As the conveyor moves through its path, the second signal generator will approach the first detector, come within a detecting range of the first detector, and move away from the first detector. The first detector may be configured to provide a third signal as the second signal generator approaches the first detector and a fourth signal as the second signal generator moves away from the first detector. For example, the third signal may be a rising edge of a digital signal (e.g., a logic '0' value moving to a logic '1' value), and the fourth signal may be a falling edge of the digital signal (e.g., a logic '1' changing to a logic '0').

The processor 30 may further be configured to calculate a belt speed based on an elapsed time between the third signal and the fourth signal. For example, using a priori knowledge of the distance between a position of the second signal generator when a third signal is provided by the first detector and a positon of the second signal generator when a fourth signal is provided by the first detector, and the time elapsed for the second signal generator to travel this distance (i.e., the time elapsed between the third signal and the fourth signal received from the first detector), the processor is configured to determine the speed of the belt (in a simple example, $$\frac{distance}{time}).$$

In some embodiments, the processor may account for factors such as temperature (e.g., ambient temperature, etc.), humidity, the radius of a curve in systems where the detector is located on the curve, the radius of a spiral belt system, the transverse (with respect to a direction of belt travel) location of the second signal generator on the belt, etc. For example, the ambient temperature can have a large effect on the length of a belt (according to a coefficient of thermal expansion of the material(s) used to make the belt). As such, the processor may be configured to compensate for elongation based on temperature using, for example, a look-up-table, a thermal expansion parameter, or other technique. Similarly, certain materials—such as, for example, polyamide—are known to expand (i.e., elongate) as a result of an increase in the ambient humidity. For this reason, the processor may be configured to compensate for elongation resulting from a change in the ambient humidity.

In some embodiments, the processor 30 is further configured to calculate a length of a segment of the belt. For example, using the time elapsed between the first signal and the third signal received by the processor, and the calculated belt speed, a length of the belt segment between the first signal generator and second signal generator may be calculated. In various embodiments, combinations of first signal and/or second signal and third signal and/or fourth signal may be used to calculate a belt segment length. In some embodiments, the processor may be further configured to calculate a belt elongation based on the calculated belt segment length and a stored previous belt segment length.

Figure 2:
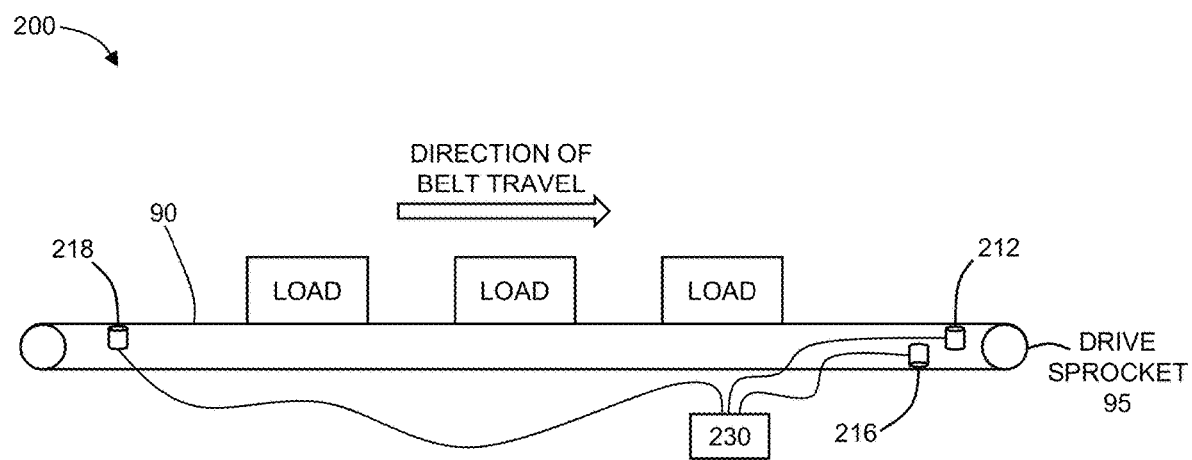
FIG. 2 is a diagram of a system according to another embodiment of the present disclosure.

In some embodiments, such as system 200 depicted in FIG. 2, a second detector 216 is provided in addition to the first detector 212. The system also includes a first signal generator and may include a second signal generator. The second detector 216 is located at a location along the length of the belt where belt tension is minimal. For example, the second detector 216 in FIG. 2 is positioned just beyond a belt drive 95 (downstream from the belt drive in the direction of belt travel). In this way, the processor 230 may be configured to differentiate between belt elongation resulting from high load and belt elongation resulting from belt wear. For example, where the elongation measured at the first detector 212 is greater than the elongation as measured at the second detector 216, then the belt is determined to be elongated due to high load on the belt. On the other hand, if the elongation as measured at each of the first detector and second detector is determined to increase at a generally equal rate, then the belt is determined to be elongated due to high wear.

In some embodiments, the system 200 may have one or more additional downstream detectors 218 located beyond the belt drive 95. Where belt 90 elongation results from high load on the belt (i.e., not by belt wear), one or more of the first detector 212, the second detector 216, and the one or more additional downstream detectors 218 may allow for the processor 230 to differentiate an elongation due to an increased loading of material on the belt (i.e., weight that is carried by the belt) versus an elongation due to higher friction of the belt system itself. For example, while changes in elongation due to higher friction occur slowly, sudden changes in elongation are more likely due to increased material loading on the belt. In another example, where elongation results from increased friction in the belt system (e.g., accumulation of dirt or other material on the conveyor components), there will be an increasing difference in the elongation measured at the first detector 212, the second detector 216, and (when present) the additional downstream detector 218. The elongation measured on the additional downstream detector 218 will fluctuate the most. In embodiments where the additional downstream detector 218 is located at the beginning of the load side of the conveyor (such as depicted in FIG. 2), the measurement will be strongly impacted by load. If the conveyor is empty (no material loaded on the belt), the elongation measured at the additional downstream detector 218 will be nearly the same as measured at second detector 216. Once a load is added to the conveyor both detectors 218 and 212 will measure a elongation (although each detector will show a different value since the belt stretch is largest where the belt force is highest—i.e., at the drive of the belt). Over a longer period of time, the difference in elongation measured at detectors 218 and 212 may increase. Assuming that the running conditions remain the same (same load) over this time, the additional elongation will be caused by increased friction on the load side. Based on a predefined threshold, a signal can be generated—e.g., a request for cleaning can be sent to the maintenance department.

In embodiments where a detector (e.g., the first detector, the second detector, and/or the one or more additional downstream detectors) is a magnetic sensor such as a hall-effect sensor, such detector may further include a pole piece to direct a magnetic field from the first signal generator (and second signal generator if present). For example, the embodiment shown in FIG. 3 includes a pole piece 352 backing the hall-effect sensor 350 so as to direct the magnetic field of magnet 360. FIG. 3 also shows a second pole piece 356 backing analog hall sensor 354.

The present disclosure provides a system for measuring a speed, length, and/or elongation of a conveyor belt. A first detector is located near a conveyor belt (e.g., near an edge of the belt, underneath the belt, etc.) at a fixed position along a path of the conveyor belt. A first signal generator is disposed on the conveyor belt such that the first signal generator is detectable by the detector when the first signal generator comes close to the first detector (i.e., as the belt advances). A second signal generator is disposed on the conveyor belt and spaced apart from the first signal generator. Similar to the first signal generator, the second signal generator is detectable by the first detector when it is near the first detector.

When a signal generator (one of the first or second signal generators) is next to the first detector, the first detector provides a signal. As the signal generator approaches the first detector, the resulting signal from the first detector will have a rising edge. As the signal generator moves beyond the first detector, the resulting signal from the first detector will have a falling edge. A speed of the conveyor belt is determined based on the timing between the rising edge and the falling edge and the known length of the signal. The speed may be determined based on one or both of the first signal generator and the second signal generator.

Length and elongation may also be measured using the time between the first signal generator and the second signal generator. In some embodiments, these values may be extrapolated to characterize the full conveyor belt.

Any of the measurements may be averaged as desired. For example, the speed of the belt may be determined as the average of the speed determined using the first signal generator and the speed determined with the second signal generator. In another example, the length may be determined by averaging the time between multiple passes of the first and/or second signal generator. Similarly, belt speed, length, and/or elongation may be alternatively or additionally measured at the second detector and/or the one or more additional downstream detectors.

Figure 4:
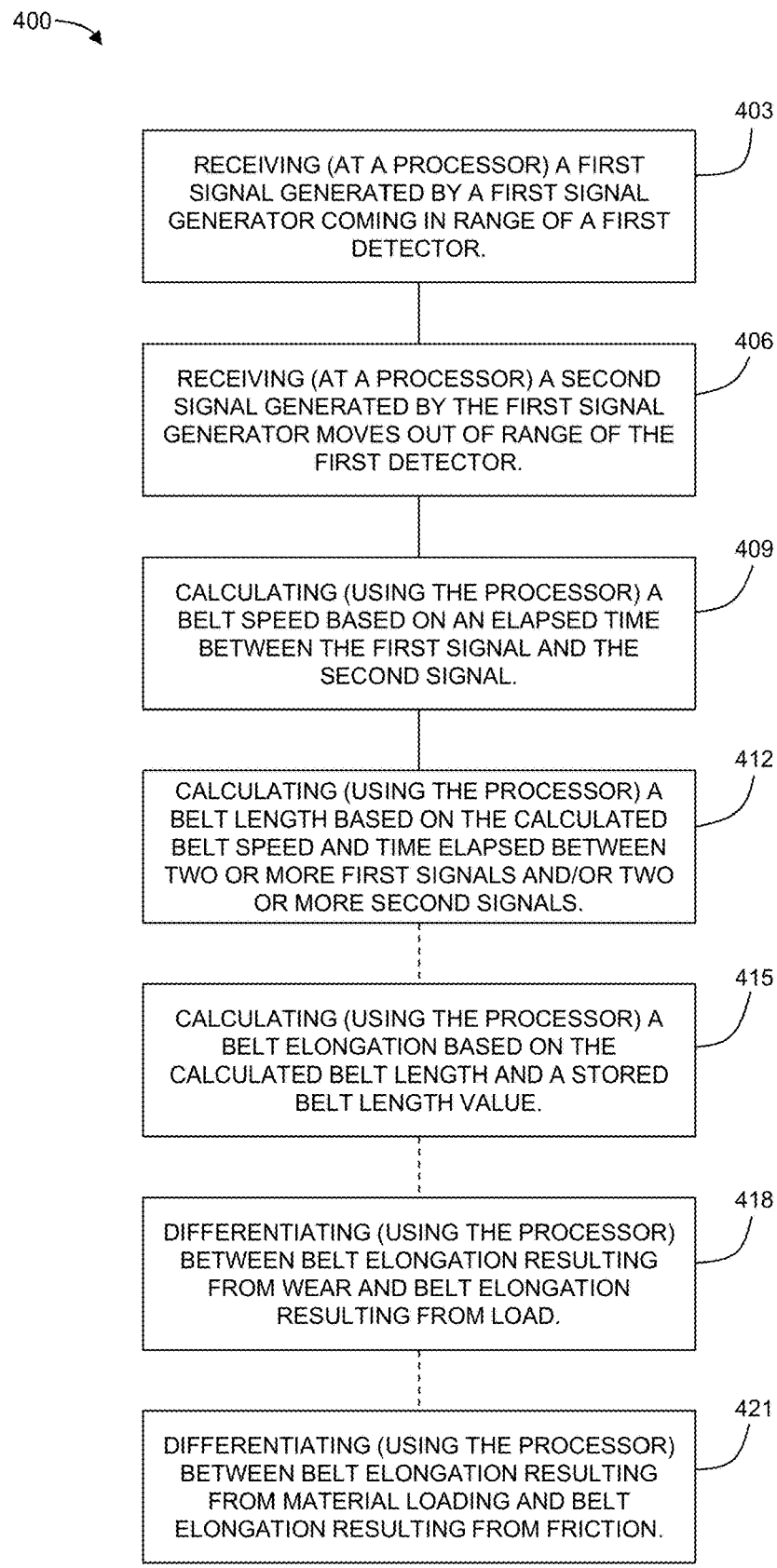
FIG. 4 is a chart showing a method according to another embodiment of the present disclosure.

With reference to FIG. 4, in another aspect, the present disclosure may be embodied as a method 400 for measuring a conveyor belt. The method 400 includes receiving 403, at a processor, a first signal generated when a first signal generator affixed to the conveyor belt comes within range of a first detector at a fixed location along a path of the belt. The processor receives 406 a second signal generated when the first signal generator moves out of range of the first detector. The method 400 includes calculating 409, using the processor, a belt speed based on an elapsed time between the first signal and the second signal. In some embodiments, the method further includes calculating 412 a belt length based on the calculated 409 belt speed and time elapsed between two or more first signals and/or two or more second signals. In some embodiments, the method further includes calculating 415 a belt elongation based on the calculated belt length and a stored belt length value.

In some embodiments, the method includes differentiating 418 between a belt elongation resulting from wear and belt elongation resulting from load, wherein the differentiating 418 is based on belt elongation calculated using signals generated at the first detector and belt elongation calculated using signals generated at a second detector. For example:

$$\Delta l = \frac{F * l}{bo * h * E}, \tag{1}$$

where $\Delta l$ is the measured elongation, F is the force within the belt, l is the length between two sensors (or if only one sensor, the length of the load-carrying section of the conveyor), bo is the belt width, h is the belt thickness, and E is the measured, non-linear elastic modulus of a belt. Therefore, the force in the belt is given with measured elongation (which may be corrected to account for changes due to wear, temperature, and/or humidity) multiplied by belt width, belt thickness, and elastic modulus, all divided by the length between the sensors (or length between start of load-carrying portion of the conveyor and the detector position). The second detector is located at a fixed position along the path of the belt and downstream from a belt drive in a direction of belt travel. In some embodiments, the method includes differentiating 421 between a belt between a belt elongation resulting from material loading and belt elongation resulting from friction, wherein the differentiating 421 is based on belt elongation calculated using signals generated at the second detector and belt elongation calculated using signals generated at one or more additional downstream detectors. The one or more additional downstream detectors are located at a corresponding one or more fixed locations along the path of the belt and downstream of the belt drive.

Although the present disclosure has been described with respect to one or more particular embodiments, it will be understood that other embodiments of the present disclosure may be made without departing from the spirit and scope of the present disclosure.

What is claimed is:

1. A system for measuring a conveyor belt, comprising:
   a first detector configured to be fixed at a location along a path of a conveyor belt;
   a first signal generator configured to be affixed to a first location of the conveyor belt such that the first signal generator is detectable by the first detector when the first signal generator is in range of the first detector;
   wherein the first detector is configured to provide a first signal as the first signal generator approaches the first detector and a second signal as the first signal generator moves away from the first detector; and
   a processor in electronic communication with the first detector, the processor configured to calculate a belt speed based on an elapsed time between the first signal and the second signal.

2. The system of claim 1, wherein the processor is further configured to calculate a belt length based on the calculated belt speed and time elapsed between two or more first signals and/or two or more second signals.

3. The system of claim 2, wherein the processor is further configured to calculate a belt elongation based on the calculated belt length and a stored belt length value.

4. The system of claim 3, further comprising a second detector at a fixed location along a path of the conveyor belt and located downstream from a belt drive in the direction of belt travel, and wherein the processor is further configured to differentiate between belt elongation resulting from wear and belt elongation resulting from load.

5. The system of claim 4, further comprising one or more additional downstream detectors at a corresponding one or more fixed locations along a path of the conveyor belt downstream from the belt drive in the direction of belt travel, and wherein the processor is further configured to differentiate between belt elongation resulting from material loading on the belt and belt elongation resulting from friction.

6. The system of claim 1, wherein the first signal generator is a magnet.

7. The system of claim 6, wherein the first detector is a hall effect sensor.

8. The system of claim 6, further comprising a pole piece adjacent to the first detector and configured to direct a magnetic field of the first signal generator towards the first detector.

9. The system of claim 1, wherein the system further comprises a distance sensor proximal to the first detector and configured to detect a distance to the conveyor belt, and wherein the processor is further configured to utilize a distance to the conveyor belt in calculating the belt speed.

10. The system of claim 9, wherein the distance sensor is an ultrasonic sensor.

11. The system of claim 9, wherein the distance sensor comprises a magnetic sensor and a magnet, the magnet being configured to be affixed to the conveyor belt at a location proximal to the first signal generator, and wherein the magnetic sensor is configured to provide a distance signal as the magnet passes the magnetic sensor.

12. The system of claim 1, further comprising a second signal generator, and wherein the first detector is configured to provide a third signal as the second signal generator approaches the first detector and a fourth signal as the second signal generator moves away from the first detector.

13. The system of claim 12, wherein the processor is further configured to calculate a belt speed based on an elapsed time between the third signal and the fourth signal.

14. The system of claim 12, wherein the processor is further configured to calculate a belt segment length between the first signal generator and the second signal generator based on at least one of the first signal and the second signal, and at least one of the third signal and the fourth signal.

15. The system of claim 14, wherein the processor is further configured to calculate a belt elongation based on the calculated belt segment length and a stored belt segment length value.

16. A method for measuring a conveyor belt, comprising:
receiving, at a processor, a first signal generated when a first signal generator affixed to the conveyor belt comes within range of a first detector at a fixed location along a path of the belt;
receiving, at a processor, a second signal generated when the first signal generator moves out of range of the first detector; and
calculating, using the processor, a belt speed based on an elapsed time between the first signal and the second signal.

17. The method of claim 16, further comprising calculating a belt length based on the calculated belt speed and time elapsed between two or more first signals and/or two or more second signals.

18. The method of claim 17, further comprising calculating a belt elongation based on the calculated belt length and a stored belt length value.

19. The method of claim 18, further comprising differentiating between a belt elongation resulting from wear and belt elongation resulting from load based on belt elongation calculated at the first detector and belt elongation calculated at a second detector, wherein the second detector is located at a fixed position along the path of the belt and downstream from a belt drive in a direction of belt travel.

20. The method of claim 19, further comprising differentiating between a belt elongation resulting from material loading and belt elongation resulting from friction based on belt elongation calculated at the second detector and belt elongation calculated at one or more additional downstream detectors, wherein the one or more additional downstream detectors are located at a corresponding one or more fixed locations along the path of the belt and downstream of the belt drive.

* * * * *